(12) United States Patent
Russell et al.

(10) Patent No.: US 8,887,649 B2
(45) Date of Patent: Nov. 18, 2014

(54) SYSTEM TO VENT SOLID FEED PUMP

(75) Inventors: Steven Craig Russell, Houston, TX (US); Derek Leslie Aldred, Granada Hills, CA (US); Jeffery Allen Rader, Burbank, CA (US); James Michael Storey, Houston, TX (US)

(73) Assignee: General Electric Company, Schenectady, NY (US)

( * ) Notice: Subject to any disclaimer, the term of this patent is extended or adjusted under 35 U.S.C. 154(b) by 800 days.

(21) Appl. No.: 13/025,058

(22) Filed: Feb. 10, 2011

(65) Prior Publication Data

US 2012/0205222 A1    Aug. 16, 2012

(51) Int. Cl.
*F23K 3/00* (2006.01)
*B65G 31/04* (2006.01)
*B65G 53/48* (2006.01)
*F04C 13/00* (2006.01)

(52) U.S. Cl.
CPC ........... *F04C 13/007* (2013.01); *B01D 2279/35* (2013.01); *F04C 2210/1044* (2013.01)
USPC .......................... 110/101 R; 198/642; 406/71

(58) Field of Classification Search
CPC ....... C21B 5/004; C21B 5/003; F27D 3/0033; F04C 13/007; F04C 2210/1044; B01D 2279/35; F23K 3/00; F23K 3/02; F23K 2203/00; F23K 2203/006; F23K 2203/008; F23K 2203/10; F23K 2203/102; F23K 2203/105; F23K 2201/201; F23K 2201/202; F23K 2201/203; F23K 2900/03001; F23K 5/18

USPC ........... 110/101 R, 104 R, 105, 108, 101 CF, 110/101 C, 101 CB, 229, 267, 348; 34/82; 55/385.4, 385.1, 283, 302; 198/642; 406/71
See application file for complete search history.

(56) References Cited

U.S. PATENT DOCUMENTS

| | | | | |
|---|---|---|---|---|
| 1,693,861 A | * | 12/1928 | Edward O'Toole | .......... 209/502 |
| 4,340,397 A | * | 7/1982 | Schulz | ............... 48/74 |
| 4,516,674 A | | 5/1985 | Firth | |
| 4,564,389 A | * | 1/1986 | Yamaoka et al. | ............... 75/492 |
| 4,670,049 A | * | 6/1987 | Kelmar | .......... 75/464 |
| 4,988,239 A | | 1/1991 | Firth | |
| 5,051,041 A | | 9/1991 | Firth | |
| 5,318,408 A | | 6/1994 | Davidsson | |
| 5,355,993 A | | 10/1994 | Hay | |
| 5,381,886 A | | 1/1995 | Hay | |
| 5,402,876 A | | 4/1995 | Hay | |
| 5,485,909 A | | 1/1996 | Hay | |
| 5,497,872 A | | 3/1996 | Pennino | |
| 5,551,553 A | | 9/1996 | Hay | |
| 5,657,704 A | | 8/1997 | Schueler | |
| 5,820,814 A | * | 10/1998 | Doumet | .......... 266/44 |
| 6,213,289 B1 | | 4/2001 | Hay | |

(Continued)

OTHER PUBLICATIONS

U.S. Appl. No. 12/831,288, filed Jul. 7, 2010, Russell.

*Primary Examiner* — Kenneth Rinehart
*Assistant Examiner* — Tavia Sullens
(74) *Attorney, Agent, or Firm* — Fletcher Yoder, P.C.

(57) ABSTRACT

A system includes a solid feed fuel pump. The solid feed fuel pump includes a solid feed flow path configured to route a solid fuel flow from an inlet to an outlet. The solid feed fuel pump also includes a vent including a filter, wherein the vent is configured to discharge fluid flow that is opposing the solid fuel flow.

13 Claims, 4 Drawing Sheets

(56) References Cited

U.S. PATENT DOCUMENTS

| | | |
|---|---|---|
| 6,887,290 B2 * | 5/2005 | Strauser et al. ................ 55/283 |
| 7,704,314 B2 | 4/2010 | Inglese et al. |
| 7,717,046 B2 | 5/2010 | Sprouse et al. |
| 2003/0024352 A1 * | 2/2003 | Wolf ............................... 75/463 |
| 2008/0060914 A1 | 3/2008 | Sprouse et al. |
| 2008/0081007 A1 * | 4/2008 | Steele et al. ................. 422/179 |
| 2010/0021247 A1 * | 1/2010 | Aldred et al. ................... 406/19 |
| 2010/0146982 A1 * | 6/2010 | Lanyi et al. .................... 75/460 |

* cited by examiner

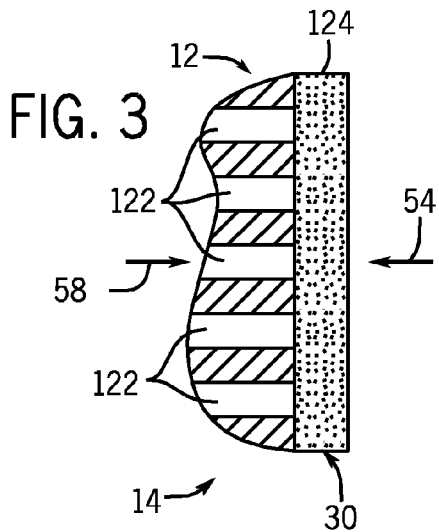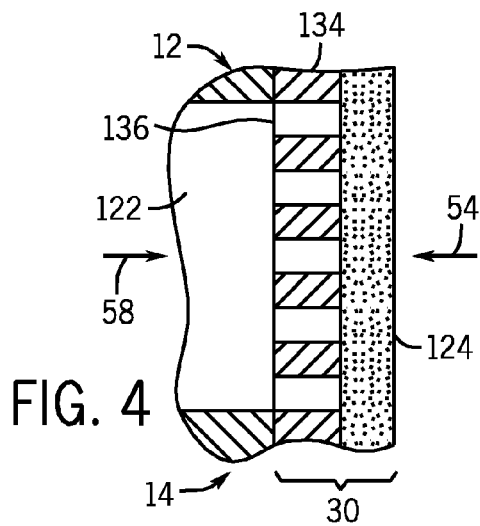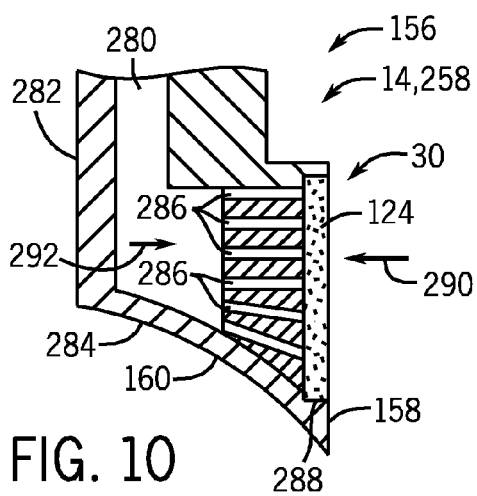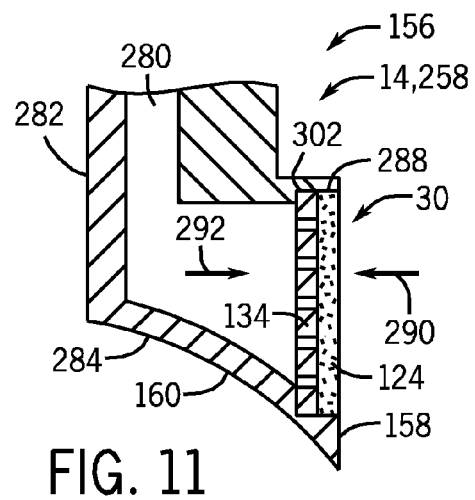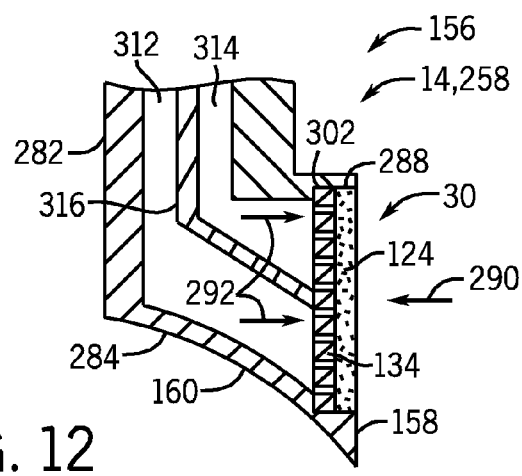

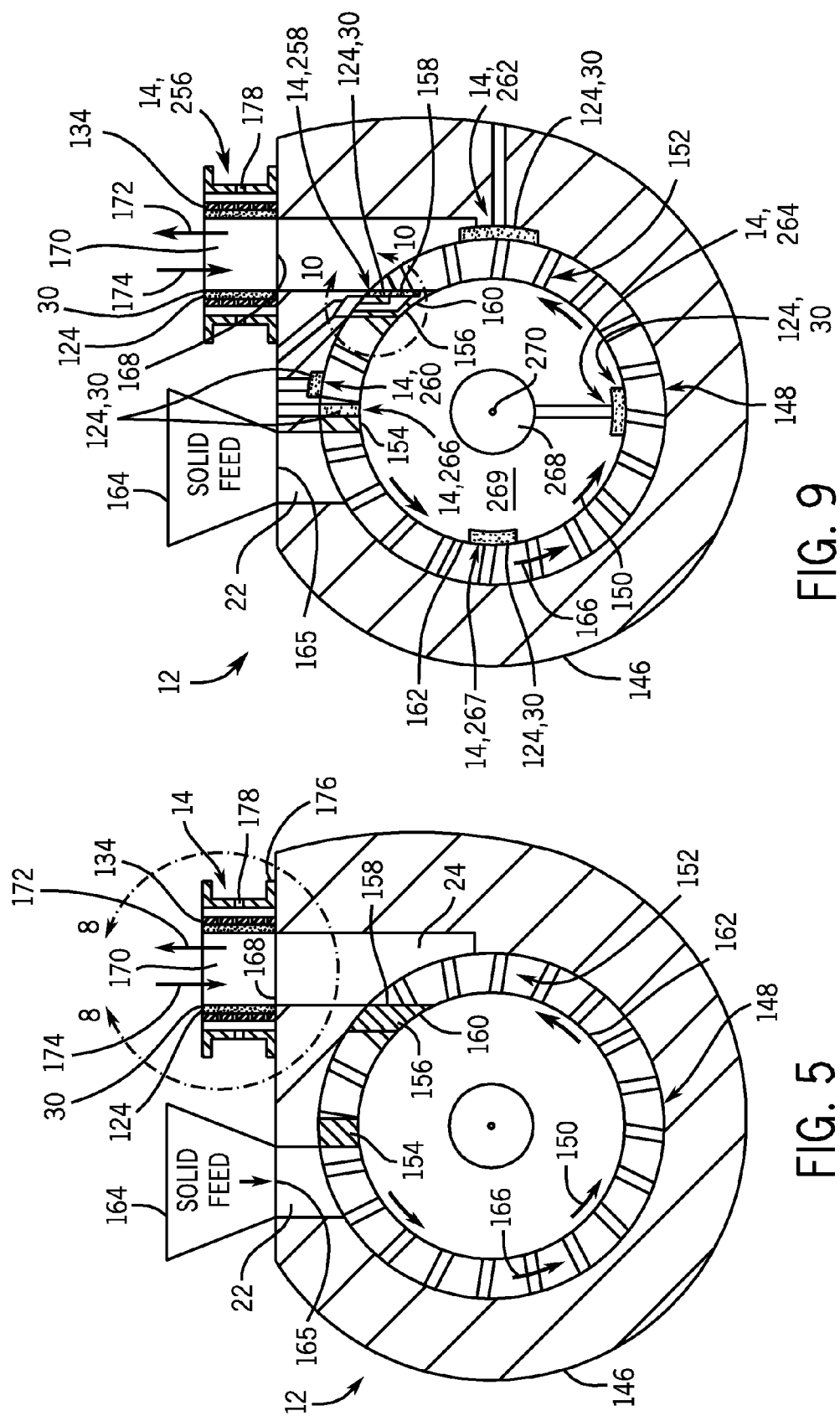

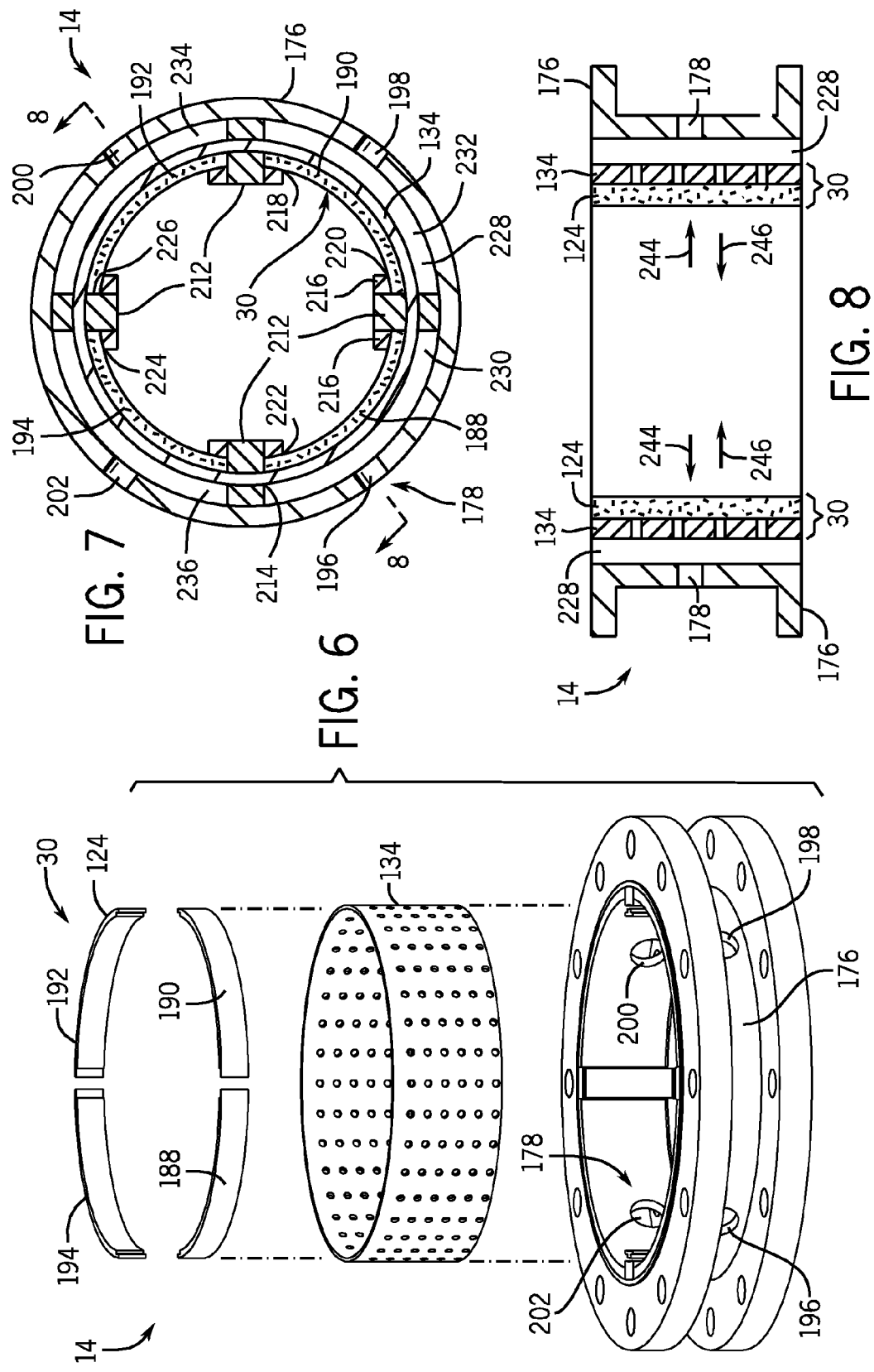

SYSTEM TO VENT SOLID FEED PUMP

BACKGROUND OF THE INVENTION

The subject matter disclosed herein relates to a solid feed pump, and more specifically, to a system to vent the solid feed pump.

A typical pump designed for solids, such as particulate matter, has a single continuous channel or multiple continuous channels. For example, the pump may be a rotary pump that drives solids along a circular path from an inlet at low pressure to an outlet at high pressure. During transport through the pump, the solids lock-up, increase in pressure, and exit the pump at a generally constant rate. In a compacted condition at the outlet, the solids block backflow of a high pressure gas. However, some of the gas may leak past the solids and interfere with intake of the solids at the inlet to reduce pump performance.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a solid feed fuel pump. The solid feed fuel pump includes a solid feed flow path configured to route a solid fuel flow from an inlet to an outlet. The solid feed fuel pump also includes a vent including a filter, wherein the vent is configured to discharge fluid flow that is opposing the solid fuel flow.

In accordance with a second embodiment, a system includes a solid feed pump vent configured to couple to a solid feed pump. The system also includes a solid feed pump filter configured to mount to the solid feed pump vent. The solid feed pump filter includes a permeable structure.

In accordance with a third embodiment, a system includes a solid feed pump vent configured to couple a solid feed pump. The solid feed pump vent includes a filter including a permeable structure. The system also includes a gas control system. The gas control system includes a gas vent system configured to control a first gas flow in a first direction through the solid feed pump vent away from the solid feed pump. The gas control system also includes a filter purge system configured to control a second gas flow in a second direction through the solid feed pump vent to purge the filter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is partial cross-sectional side view of an embodiment of the vent of FIGS. 1 and 2;

FIG. 4 is a partial cross-sectional side view of an embodiment of the vent of FIGS. 1 and 2;

FIG. 5 is a cross-sectional side view of an embodiment of the solid feed pump of FIGS. 1 and 2 having a single vent at an outlet of the solid feed pump;

FIG. 6 is an exploded view of an embodiment of the vent of FIG. 5;

FIG. 7 is a cross-sectional top view of an embodiment of the vent of FIG. 5;

FIG. 8 is a cross-sectional side view of an embodiment of the vent of FIG. 5, taken within line 8-8 of FIG. 5 and along line 8-8 of FIG. 7;

FIG. 9 is a cross-sectional side view of an embodiment of the solid feed pump of FIGS. 1 and 2 having multiple vents;

FIG. 10 is a cross-sectional side view of an embodiment of a solid feed guide of FIG. 9 having the vent, taken within line 10-10 of FIG. 9;

FIG. 11 is a cross-sectional side view of an embodiment of the solid feed guide of FIG. 9 having the vent, taken within line 10-10 of FIG. 9; and FIG. 12 is a cross-sectional side view of an embodiment of the solid feed guide of FIG. 9 having the vent, taken within line 10-10 of FIG. 9.

DETAILED DESCRIPTION OF THE INVENTION

Figure 1:
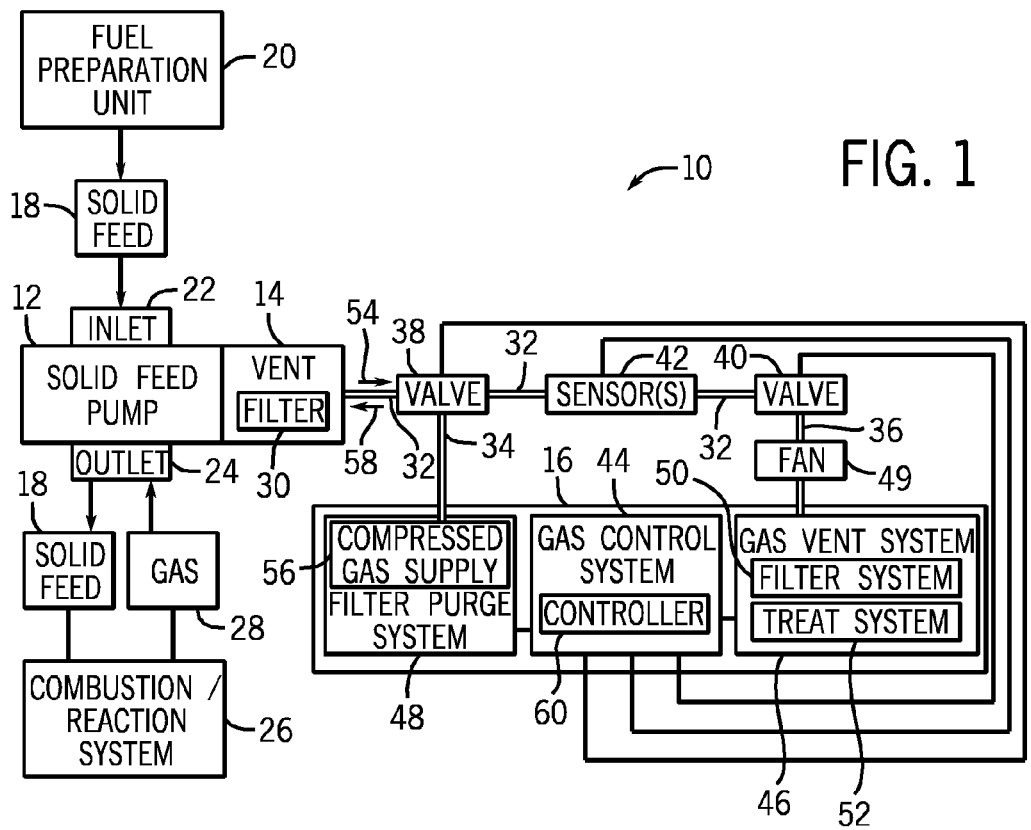
FIG. 1 is a schematic diagram of an embodiment of a system for venting a fluid from a solid feed pump utilizing a single vent.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a system to vent undesired high pressure gases from a solid feed pump that may interfere with solids intake at an inlet of the pump, may interfere with the grip on the solids in a transport duct, and may interfere with the condition of the solids plug at an outlet of the pump thereby improving the performance of the pump. For example, in certain embodiments, the system includes the solid feed pump with a solid feed flow path configured to route a solid fuel flow from the inlet to an outlet, and a vent with a filter. The vent is configured to discharge a fluid flow (e.g., high pressure gases) that is opposing the solid fuel flow. The filter may include a permeable structure. For example, the filter may include a highly perforated structure. Alternatively, the filter may include a compacted particulate structure that includes a sintered powder structure, multiple metal particles compacted together, or multiple ceramic particles compacted together, known as a sintered particle filter. Also, the filter may include a perforated filter support disposed adjacent the compacted particulate structure or highly perforated structure. The vent may include an annular housing having at least one vent outlet, wherein the perforated support extends annularly inside the annular housing, and the compacted particulate structure extends annularly inside the perforated filter support. Multiple vent passages may be coupled to the solid feed pump with each vent passage including a separate filter element.

In some embodiments, the system includes a solid feed pump filter configured to mount to the vent of the solid feed pump. As above, the solid feed pump filter includes the permeable structure. Indeed, a solid feed guide, configured to extend crosswise to the solid feed flow path of the solid feed pump, may have the permeable along a vent passage. In further embodiments, the system includes a solid feed pump vent configured to couple to the solid feed pump. As above, the solid feed pump vent includes a filter including the permeable structure. The system also includes a gas control system that includes a gas vent system configured to control a first gas flow in a first direction through the solid feed pump vent away from the solid feed pump (i.e., to vent high pressure gases). The gas control system also includes a filter purge system configured to control a second gas flow in a second direction through the solid feed pump vent to purge the filter (i.e., remove or clean solids from the filter). The filter, in conjunction with the gas control system, may allow removal of high pressure gases that leak past solids in a compacted condition near an outlet of the solid feed pump to be vented, thus, improving solids filling at the inlet and pump performance.

FIG. 1 is a schematic diagram of an embodiment of a system 10 for venting a fluid (e.g., high pressure gas) from a solid feed pump 12 (e.g., solid feed fuel pump) utilizing a single vent 14 (e.g., solid feed pump vent). The solid feed pump 12 may be a Posimetric® pump. The term "posimetric" may be defined as capable of metering (e.g., measuring an amount of) and positively displacing (e.g., trapping and forcing displacement of) a substance being delivered by the pump 12. The pump 12 is able to meter and positively displace a defined volume of a substance, such as a solid fuel feedstock (e.g., a carbonaceous feedstock). The pump path may have a circular shape or curved shape. Alternatively, the solids pump path may be linear. The pump 12 may be used in any suitable application such as an integrated gasification combined cycle system. Other suitable applications include production of chemicals, fertilizers, substitute natural gas, transportation fuels, or hydrogen.

The system 10 includes the solid feed pump 12, the vent 14, and a gas management system 16. The system 10 may include a fuel source, such as a solid feed 18, that may be utilized as a source of energy. The fuel source may include coal, petroleum coke, biomass, wood-based materials, agricultural wastes, tars, asphalt, or other solid carbonaceous fuel. The solid fuel of the fuel source may be passed through a fuel preparation unit 20. The fuel preparation unit 20 may, for example, resize or reshape the fuel source by chopping, milling, shredding, pulverizing, briquetting, or pelletizing the fuel source to generate the dry solid feed 18 (e.g., particulate matter). In other words, the fuel preparation unit 20 is configured to prepare a solid carbonaceous fuel as solid feed 18 for the solid feed pump 12 (e.g., solid feed fuel pump). In certain embodiments, the solid feed pump 12 may be used to transport solid feed in non-fuel applications.

In the illustrated embodiment, the fuel preparation unit 20 is coupled to an inlet 22 of the solid feed pump 12. The solid feed pump 12 is configured to meter and transport the fuel source received from the fuel preparation unit 20 into a pressurized environment. As described in greater detail below, the solid feed 18 upon entering the solid feed pump 12 via the inlet 22 is conveyed from low to high pressure before being discharged from an outlet 24 of the pump 12. In certain embodiments, locations of the inlet 22 and the outlet 24 of the pump 12 may vary. During transport through the pump 12, the solid feed 18 locks-up, increases in pressure, and exits the pump 10 at a generally constant rate. The pump 12 delivers the solid feed 18 from the fuel preparation unit 20 to a combustion/reaction system 26. For example, the combustion/reaction system 26 may include a gasifier coupled to the outlet 24 of the solid feed pump 12. Simultaneously, in the compacted condition at the outlet 22, the solid feed 18 forms a plug separating a higher pressure zone at the outlet 22 from a lower pressure zone in the pump 12 (e.g., at the inlet 22). In particular, the solid feed plug blocks backflow of a fluid (e.g., high pressure gas 28) into the pump 12 (e.g., in an upstream direction) that opposes a solid fuel flow (e.g., in a downstream direction) of the solid feed 18. However, the solid feed plug may be slightly permeable and allow high pressure gas 28 to leak into the pump 12. The backflow of the gas 28 into the solid feed pump 12 may interfere with filling the solid feed 18 at the inlet 22 of the pump 12, may interfere with the grip on the solids in the transport duct, and may interfere with the smooth discharge of solids from the outlet of the pump 12.

The pump 12 includes the vent 14 to remove the high pressure gas 28 from the solid feed pump 12. In other words, the vent 14 is configured to discharge a fluid flow (e.g., higher pressure gas flow) that is opposing the solid fuel flow (e.g., solid feed flow). In certain embodiments, the pump 12 may include more than one vent 14. As described in greater detail below, locations of the vents 14 may vary. For example, the vents 14 may be located around the outlet 24, on an abutment between the inlet 22 and the outlet 24 where the solid feed 18 does not flow, on a glide duct near the outlet 24, on a pump rotor, on an abutment adjacent the inlet 22, or on a solid feed guide disposed adjacent the outlet 24.

The vent 14 includes a filter 30. The filter 30 includes a permeable structure (i.e., towards gas). For example, the filter 30 may include a highly porous structure. Alternatively, the filter 30 may include a compacted particulate structure as described in greater detail below. For example, the compacted particulate structure (e.g., sintered structure) may include a sintered powder structure, a plurality of metal particles compacted together, or a plurality of ceramic particles compacted together, known as a sintered particle filter. In some embodiments, the permeable structure of the filter 30 is removable and, thus, replaceable with another permeable structure to prevent clogging of the filter 30. In certain embodiments, the filter 30 includes a perforated filter support disposed adjacent the permeable structure.

As illustrated, the gas management system 16 is coupled to the vent 14 via conduits 32, 34, and 36. Valves 38 and 40 couple conduit 32 to conduits 34 and 36, respectively. In certain embodiments, the valves 38 and 40 include three-way valves. One or more sensors 42 are disposed between valves 38 and 40 along conduit 32 to take flow and/or pressure measurements of fluid flow (e.g., gas flow). In certain embodiments, sensors may also be disposed upstream of valve 38 at the pump 12. The gas management system 16 includes a gas control system 44 that includes a gas vent system 46 and a filter purge system 48. The conduits 34 and 36 are coupled to the filter purge system 48 and the gas vent system 46, respectively. A fan 49 is disposed along conduit 36 between the valve 40 and the gas vent system 50 to induce gas flow. The gas vent system 46 includes a filter system 50 configured to filter the gas 28 vented from the solid feed pump 12. The filter system 50 may include a baghouse to remove solid particles from the gas 28. The gas vent system 46 also includes a treatment system 52 configured to treat the vented high pressure gas 28 to remove and/or capture chemicals present in the gas 28. The gas vent system 46 is coupled to the vent 14 and configured to control a first gas flow (e.g., high pressure gas) in a first direction 54 through the vent 14 (e.g., solid feed pump vent) away from the solid feed pump 12. In certain embodiments, the gas vent system 46 and/or fan 49 may locally located near the pump 12 or remote from the pump 12 at a centralized location, for example, at a plant.

The filter purge system 48 includes a compressed gas supply 56. The filter purge system 48 is configured to control a second gas flow from the supply 56 in a second direction 58 through the vent 14 to purge (i.e., clean) the filter 30. During venting, the vent 14 is configured to vent gas 28 (e.g., high pressure gas) from the solid feed pump 12 through the filter 30 in the first direction 54. During purging, the filter purge system 48 is configured to direct a purge gas from the compress gas supply 56 through the filter 30 in the second direction 58 opposite from the first direction 54. Examples of the purge gas may include nitrogen or carbon dioxide.

The gas control system 44 includes a controller 60 configured to control gas flow through conduits 32, 34, and 36 via both control of valves 38 and 40 and control the gas vent system 46 and the filter purge system 48. In particular, the controller 60 receives feedback from the one or more sensors 42 disposed between valves 38 and 40 and at the pump 12. The feedback includes flow and/or pressure measurements related to gas flow through conduit 32. During venting operations, the controller 60 adjusts valve 38 to allow the first gas flow (e.g., high pressure gas flow) in the first direction 54 away from the solid feed pump 12 along conduit 32, but not allow gas flow along conduit 34 to or from the filter purge system 48. In addition, the controller 60 adjusts valve 40 to allow gas flow along conduit 36 to the gas vent system 46. For example, the controller 60 could control valves to increase flow if pressure is high or decrease flow if pressure is low. During purging operations, the controller 60 adjusts valve 38 to allow the second gas flow (e.g., purged gas) in the second direction 58 through the vent 14 to purge the filter 30. In addition, the controller 60 closes valve 40 and adjust valve 38 to allow gas flow from conduit 34 to conduit 32 towards the filter 30, but not gas flow along conduit 32 towards valve 40. The controller 60 may initiate purging operations based on feedback from the sensors 42 and/or a routine basis. For example, routine purging operations may be scheduled based on a number of factors including the type of solid feed 18 used and a total amount of hours operating the solid feed pump 12. Alternatively, routine purging operations may be scheduled on a cyclical basis based solely on time (e.g., minutes or hours since last purging operation). The controller 60 may be used automatically and/or manually to control venting and purging operations. As described, the embodiment allows the removal of high pressure gases that leak past compacted solids in or near the outlet 24 of the solid feed pump 12 to be vented to improve solids filling at the inlet 22 and pump performance.

Figure 2:
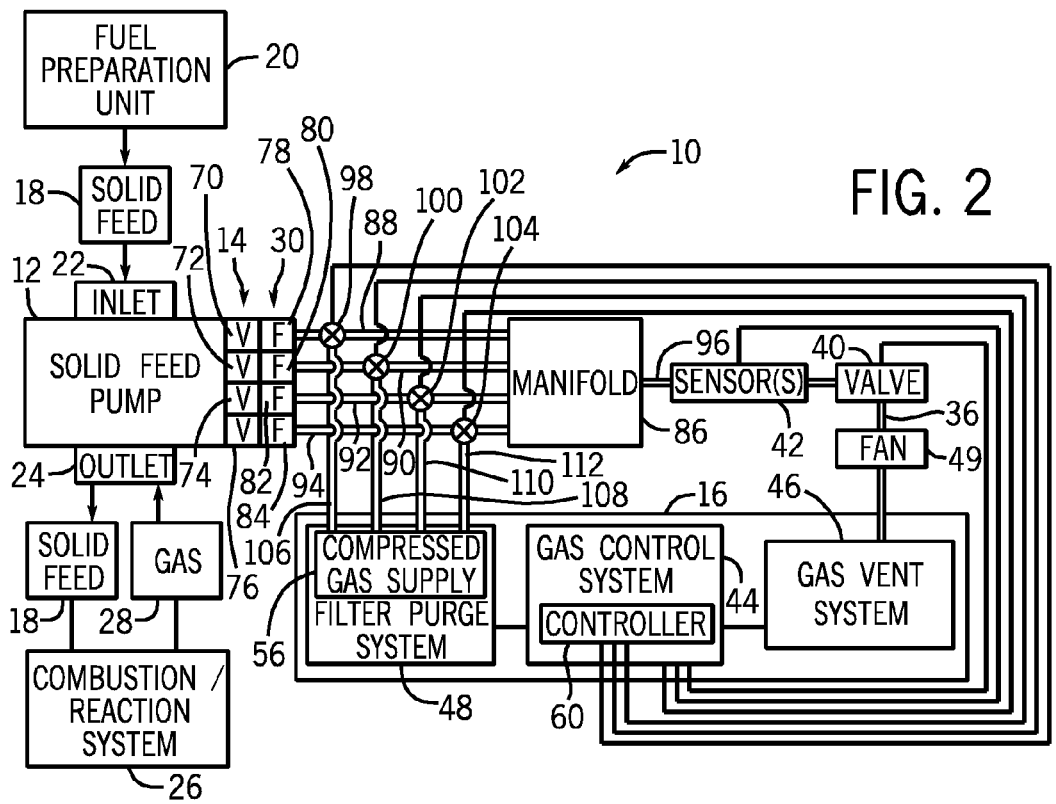
FIG. 2 is a schematic diagram of an embodiment of a system for venting the fluid from the solid feed pump utilizing multiple vents.

As mentioned above, the solid feed pump 12 may include multiple vents 14. FIG. 2 is a schematic diagram of an embodiment of a system 10 for venting the fluid (e.g., high pressure gas) from the solid feed pump 12 utilizing multiple vents 14. In general, the system 10 is as described in FIG. 1 except for differences noted below. For instance, the solid feed pump 12 includes multiple vents 14 (e.g., 70, 72, 74, and 76) each including filters 30 (e.g., 78, 80, 82, and 84). In certain embodiments, the vents 14 and their respective filters 30 are separate from the other vents 14. In other embodiments, the vents 14 and their respective filters 30 form portions of a single unit. For example, the vent 14 (see FIG. 9) includes a plurality of vent passages (e.g., 70, 72, 74, and 76) coupled to the solid feed pump 12, the filter 30 includes a plurality of filter elements (e.g. 78, 80, 82, and 84), and each vent passage 70, 72, 74, and 76 of the plurality of vent passages 70, 72, 74, and 76 has a separate filter element 78, 80, 82, and 84 of the plurality of filter elements 78, 80, 82, and 84. As described in greater detail below, locations of the vents 14 may vary. For example, the vents 14 may be located around the outlet 24, on a pump housing between the inlet 22 and the outlet 24 where the solid feed 18 does not flow, on a glide duct near the outlet 24, on a pump rotor, on an abutment adjacent the inlet 22, or on a solid feed guide disposed adjacent the outlet 24.

As illustrated, each vent 70, 72, 74, and 76 and its respective filter 78, 80, 82, and 84 is coupled to a manifold 86 via respective conduits 88, 90, 92, and 94. The manifold 86 combines fluid flow (e.g., high pressure gas 28) from each conduit 88, 90, 92, and 94 into a common conduit 96. The common conduit 96 is coupled to valve 40. One or more sensors 42, as described above, are disposed along the common conduit 96 prior to valve 40. The valve 40 couples the common conduit 96 to conduit 36, which is coupled to gas vent system 46 of the gas management system 16. Each conduit 88, 90, 92, and 94 includes a valve 98, 100, 102, and 104, respectively. As mentioned above, in certain embodiments, the valves 98, 100, 102, and 104 include three-way valves. The valves 98, 100, 102, and 104 couple conduits 88, 90, 92, and 94 to respective conduits 106, 108, 110, and 112. Conduits 106, 108, 110, and 112 are coupled to the gas management system 16, in particular, the filter purge system 48. As above, the controller 60 of the gas control system 44, in response to feedback from the one or more sensors 42, controls the venting and purging operations via control of the gas vent system 46, the filter purge system 48, and the valves 98, 100, 102, and 104. In certain embodiments, the controller 66 may conduct venting or purging operations utilizing all of the vents 70, 72, 74, and 76 of the solid feed pump 12. In other embodiments, the controller 66 may conduct venting and/or purging operations utilizing only some of the vents 70, 72, 74, and 76, while not using other vents 70, 72, 74, and 76. In some embodiments, the controller 66 may conduct venting and purging operations simultaneously utilizing all of the vents 70, 72, 74, and 76. For example, venting operations may occur in vents 70, 72, and 74, while purging occurs in vent 76. Indeed, any combination of venting and/or purging operations may occur independently or simultaneously in the vents 70, 72, 74, and 76. As described, the embodiment also allows the removal of high pressure gases that leak past solids in a compacted condition near the outlet 24 of the solid feed pump 12 to be vented to improve solids filling at the inlet 22 and pump performance.

FIGS. 3 and 4 provide embodiments of the vents 14 utilized above. FIG. 3 is a partial cross-sectional side view of an embodiment of the vent 14 of FIGS. 1 and 2. The vent 14 (e.g., solid feed pump vent) is configured to couple to a solid feed pump 12. The vent 14 includes solid feed pump filter 30 and a plurality of vent passages 122. In certain embodiments, the plurality of vent passages 122 is integral to a component of the solid feed pump 12 (e.g., solid feed guide). In other embodiments, the vent 14 includes a single vent passage 122. The plurality of vent passages 122 allows the venting of gas (e.g., high pressure gas) from the solid feed pump 12 through the filter 30 in the first direction 54. In addition, the plurality of vent passages 122 allows purge gas to flow through the filter 30 in the second direction 58 opposite from the first direction 54.

The solid feed pump filter 30 is configured to mount to the vent 14 of the solid feed pump 12. As illustrated, the filter 30 mounts directly on the solid feed pump 12. The solid feed pump filter 30 includes a permeable structure 124. For example, the permeable structure 124 includes a highly perforated structure. Alternatively, the permeable structure 124 includes a pressed or compacted particulate structure. In certain embodiments, the compacted particulate structure includes a plurality of particles compressed together. For example, the compacted particulate structure may include a plurality of metal particles, a plurality of ceramic particles, or a combination thereof, compacted together. The metals may include stainless steel, bronze, or other metal alloys. In some embodiments, the compacted particulate structure may include a sintered powder structure. The sintered powder structure may also include a plurality of metal particles, a plurality of ceramic particles, or a combination thereof. The size of the particles may range from approximately 0.1 to 100 microns, 0.1 to 50 microns, 0.1 to 20 microns, 0.1 to 10 microns, or any other size. For example, the size of the particles may be approximately 1, 2, 3, 4, 5, 6, 7, 8, 9, 10, 15, or 20 microns, or any other size. The average opening or pore size of the permeable structure may range from approximately 0.1 to 100 microns, 0.1 to 50 microns, 0.1 to 20 microns, 0.1 to 10 microns, or any other opening or pore size. For example, the average opening or pore size may be less than approximately 1, 10, 20, 30, 40, 50, 60, 70, 80, 90, or 100 microns. The average pore size in embodiments with the compacted particulate structure may be dependent on particle composition, temperature, particle size, duration of the sintering process, and other factors.

FIG. 4 is a partial cross-sectional side view of another embodiment of the vent 14 of FIGS. 1 and 2. The vent 14 is as described in FIG. 3 with a few differences noted below. The vent 14 includes a single vent passage 122 and solid feed pump filter 30. The filter 30 includes the permeable structure 124 and a perforated filter support 134 disposed adjacent the permeable structure 124. The perforated filter support 134 includes perforations 136 ranging from approximately 1/32 inch diameter to 1/4 inch diameter, or any other size. For example, the diameter of the perforations 136 may be approximately 1/32 inch, 1/16 inch, 1/8 inch, or 1/4 inch. The spacing between the perforations may range from 1/32 inch to 1/4 inch. In general, the perforations 136 may be larger than the openings or pores of the permeable structure 124. The perforated filter support 134 may include metal, such as stainless steel or another high alloy steel. As above, the solid feed pump filter 30 is configured to mount to the vent 14 of the solid feed pump 12. As illustrated, the permeable structure 124 mounts on the solid feed pump 12 via the perforated filter support 134. The embodiments of the vent 14 in FIGS. 3 and 4 enable venting of high pressure gases that leak past solids in a compacted condition near the outlet 24 of the solid feed pump 12, thereby improving solids filling at the inlet 22 and pump performance.

As mentioned above, the vents 14 may be located at a variety of locations throughout the solid feed pump 12. FIG. 5 is a cross-sectional side view of an embodiment of the solid feed pump 12 of FIGS. 1 and 2 having a single vent 14 at the outlet 24 of the solid feed pump 12. As shown in FIG. 5, the solid feed pump 12 includes a pump housing 146, the inlet 22, the outlet 24, pump rotor 148 disposed in the pump housing 146, and the vent 14. The pump rotor 148 may include two or more substantially opposed and parallel rotary discs, which include discrete cavities defined by protrusions to drive solids therebetween. The rotary discs are movable relative to the pump housing 146 in a rotational direction 150 from the inlet 22 towards the outlet 24. The inlet 22 and the outlet 24 are coupled to an internal feed passage or curved passage 152 (e.g., circular or annular passage). In certain embodiments, the pump 12 may include multiple passages 152. Also, in some embodiments, the pump 12 may be configured to have a linear flow passage driven by opposed and parallel moving walls. The curved passage 152 is disposed between the two rotary discs and within the pump housing 146. The curved passage 152 includes a solid feed flow path configured to route a solid fuel flow (e.g., solid feed) from the inlet 22 to the outlet 24. In other words, the solid feed flow path 152 curves around the pump rotor 148 from the inlet 22 to the outlet 24. An abutment 154 is disposed adjacent the inlet 22. A solid feed guide 156 is disposed adjacent the outlet 162. The solid feed guide 156 extends across the curved passage 152 between the rotary discs. As illustrated, the solid feed guide 156 is configured to extend crosswise into the solid feed flow path 152 of the solid feed pump 12. The solid feed guide 156 may include a guide wall 158 and a surface 160 that interfaces with the pump rotor 148. To ensure efficient performance of the solid feed pump 12, the rotor interfacing surface 160 of the solid feed guide 156 may be closely contoured to the shape of an outer surface 162 of the pump rotor 148.

As solid feed (e.g., particulate matter) is fed through a hopper 164 through an opening 165 of the inlet 22 at a region of lower pressure, the solid feed pump 12 imparts a tangential force or thrust to the particulate matter in the rotational direction 150 of the pump rotor 148. The direction of solid feed flow 166 (i.e., in a downstream direction) is from the inlet 22 to the outlet 24 at a region of higher pressure. As the solid feed rotates through the solid feed flow path 152, the solid feed encounters the guide wall 158 of the solid feed guide 156 disposed adjacent the outlet 24 extending across the solid feed flow path 152. In this region, the solid feed is compacted, forms a solids plug, and exits the pump 12 at a generally constant rate. The solid feed guide 156 routes the solid feed through the outlet 24 and through a discharge opening 168 into an outlet pipe 170, generally indicated by arrow 172, connected to a high pressure vessel or into a conveyance pipe line.

As described above, the solid feed in the compacted condition forms a plug at the outlet 24 to block backflow of high pressure gas into the solid feed pump 12 in an upstream direction 174 that opposes the solid fuel flow (e.g., solid feed flow). The vent 14 is disposed around the outlet pipe 170. The vent 14 is configured to discharge the fluid flow 174 (e.g., high pressure gas) that is opposing the solid feed flow. The vent 14 includes an annular housing 176 having at least one vent outlet 178, the perforated filter support 134 extending annularly inside the annular housing 176, and the permeable structure 124 extending annularly inside the perforated filter support 134. The permeable structure 124 and the perforated filter support 134 are as described above. The vent 14 allows the venting of high pressure gas from the outlet pipe 170 through the one or more vent outlets 178. As a result, solids filling at the inlet 22 and pump performance may improve.

FIGS. 6-8 illustrate further embodiments of the vent 14 in FIG. 5. FIG. 6 is an exploded view of an embodiment of the vent 14 of FIG. 5. As mentioned above, the vent 14 includes the annular housing 176 having at least one vent outlet 178, the perforated filter support 134 extending annularly inside the annular housing 176, and the permeable structure 124 extending annularly inside the perforated filter support 134. As illustrated, the permeable structure 124 of the filter 30 includes a plurality of filter elements 188, 190, 192, and 194. The number of filter elements may range from 1 to 16, 1 to 12, 1 to 8, 1 to 4, 1 to 2, or any other suitable number. In certain embodiments, the filter elements are stackable upon each other. For example, the filter elements may be stacked vertically upon each other. The filter elements 188, 190, 192, and 194 are disposed within the perforated filter support 134. The filter elements 188, 190, 192, and 194 and the perforated filter support 134 are disposed within the housing 176. The housing 176 includes at least one vent outlet 178. As illustrated, the housing 176 includes a plurality of vent outlets 196, 198, 200, and 202. The number of vent outlets 178 may range from 1 to 8 or any other suitable number.

FIG. 7 illustrates an assembly of the vent 14 of FIG. 5. FIG. 7 is a cross-sectional top view of an embodiment of the vent 14 of FIG. 5. The housing 166 includes retainers 212 configured to allow the assembly of the housing 166 with the perforated filter support 134 and the permeable structure 124 of the filter 30. The number of retainers 212 may range from 1 to 8, 1 to 4, 1 to 2, or any other suitable number. In particular, the retainers 212 include slots 214 that allow insertion of the perforated filter support 134 within the housing 176. In addition, the retainers 212 include extensions 216. Adjacent extensions 216 of adjacent retainers 212 form slots 218 that allow the insertion of the permeable structure 124. The number of slots 218 may range from 1 to 8, 1 to 4, 1 to 2, or any other suitable number. As illustrated, slots 218 formed by the retainers 212 include slots 220, 222, 224, and 226. These slots 220, 222, 224, and 226 support filter elements 188, 190, 192, and 194, respectively. The slots 218 are configured to allow the stacking of the filter elements vertically upon each other within each slot 218. In certain embodiments, the filters elements may include stepped ledges so the surface of the filter elements are flush with the retainers 212. The retainers 212 and perforated filter support 134 form independent vent passages 228, such as vent passages 230, 232, 234, and 236. Each vent passage 230, 232, 234, and 236 is associated with respective filter element 188, 190, 192, and 194, and respective vent outlet 196, 198, 200, and 202. Due to the independent vent passages 228, venting and purging operations may be conducted independently for each vent passage 228 as described above.

FIG. 8 is a cross-sectional side view of an embodiment of the vent 14 of FIG. 5, taken within line 8-8 of FIG. 5 and along line 8-8 of FIG. 7. The vent 14 is configured to vent gas (e.g., high pressure gas) from the solid feed fuel pump 12 through the filter 30 in direction 244. In particular, during venting operations, the gas travels in direction 244 through the permeable structure 124 and the perforated filer support 134 to the vent passages 228. The gas in the vent passages 228 is vented via the vent outlets 178 to the gas vent system 46, for example, for filtering at a baghouse. Alternatively, during purging operations, a purge gas is received in the vent outlets 178 and directed in direction 246, opposite from direction 244, to clean or purge the permeable structure 124. The embodiments in FIGS. 6-8 enable venting of high pressure gases that leak past solids in a compacted condition near the outlet 24 of the solid feed pump 12, thereby improving solids filling at the inlet 22 and pump performance.

As mentioned above, multiple vents 14 may be located at a variety of locations throughout the solid feed pump 12. FIG. 9 is a cross-sectional side view of an embodiment of the solid feed pump 12 of FIGS. 1 and 2 having multiple vents 14. The solid feed pump 12 is as described above in FIG. 9 except the pump 12 includes multiple vents 14. As described above, the outlet pipe 170 includes vent 256 disposed about the outlet pipe 170. In addition, solid feed pump 12 includes vent 258 located along the guide wall 158 of the solid feed guide 156, vent 260 disposed on the pump housing 146 between the inlet 22 and the outlet 24 where the solid feed does not flow, vent 262 on the glide duct near the outlet 24, multiple vents 264 and 267 disposed on the pump rotor 148, and vent 266 disposed on the abutment 154 adjacent the inlet 22. Each vent 256, 258, 260, 262, 264, 266, and 267 includes filter 30 and permeable structure 124 as described above. Vents 258, 260, 262, and 266 vent the gas through the housing 146 to the gas vent system 46, for example, for filtering at a baghouse. Vent 264 vents the gas through the rotor 148 to a shaft 268 centrally located in the rotor 148. From the shaft 268, the gas may be vented through an opening 270 to the gas vent system 46 as above. Vent 267 vents the gas through the rotor 148 to a pump internal housing 269 inside of the rotor 148. From the housing 269, the gas may be vented through an opening (not shown) to the gas vent system 46 as above. In some embodiments, the pump 12 includes at least one or more of the vents 256, 258, 260, 262, 264, 266, and 267. In other embodiments, the pump 12 includes all of the vents 256, 258, 260, 262, 264, 266, and 267. The vents 14 operate in conjunction with the gas management system as described above. Indeed, in certain embodiments, a combination of some of the vents 14 may undergo venting operations while other vents 14 undergo purging operations. These various embodiments of the vents 14 enable venting of high pressure gases that leak past solids in a compacted condition near the outlet 24 of the solid feed pump 12, thereby improving solids filling at the inlet 22 and pump performance.

FIGS. 10-12 illustrate embodiments of the vent 258 associated with the solid feed guide 156 in FIG. 9. FIG. 10 is a cross-sectional side view of an embodiment of the solid feed guide 156 of FIG. 9 having the vent 258, taken within line 10-10 of FIG. 9. As mentioned above, the solid feed guide 156 includes the guide wall 158 and the rotor interfacing surface 160. The solid feed guide 156 also includes a common vent passage 280 and filter 30 including the permeable structure 124 along the vent passage 280. The common vent passage 280 extends from an upper portion 282 to a lower portion 284 of the solid feed guide 256. In certain embodiments, the vent passage 280 may extend to a backside of the solid feed guide 156 to vent gas out the back of the guide 156. The common vent passage 280 is fluidly coupled to perforations or passages 286 integral to the lower portion 284 of the solid feed guide 156. The lower portion 284 of the solid feed guide 156 includes a recess or slot 288 for attaching the permeable structure 124 to the guide wall 158 of the solid feed guide 156 and across the passages 286. The permeable structure 124 is removable and replaceable (e.g., if structure is worn out). In addition, the permeable structure 124 may be swapped out for different structures 124 depending on the type of solid feed, the expected gases, and other factors. The solid feed guide 156 including the permeable structure 124 extends crosswise into solid feed flow path 152 of the pump 12. High pressure gas present in the solid feed pump 12 flows from the pump 12 through the filter 30 in direction 290 and through the common vent passage 280 to the gas vent system 46. During purging operations, purge gas flows through the passage 280 and then through passages 286 and the filter 30 in direction 292 opposite from the direction 290. The flow of the purging gas cleans the filter to remove particulate matter build-up on the filter 30.

FIG. 11 is a cross-sectional side view of another embodiment of the solid feed guide 156 of FIG. 9 having the vent 258, taken within line 10-10 of FIG. 9. The solid feed guide is as described in FIG. 10 except as noted in the following. The vent passage 280 extends from the upper portion 282 to the lower portion 284 of the solid feed guide 156 up to the filter 30. The filter 30 includes the perforated filter support 134 and the permeable structure 124 as described above. The perforated filter support 134 also includes a recess or slot 302 for attaching the perforated filter support 134 to the guide wall 158 of the solid feed guide 156. The permeable structure 124 is attached adjacent to the perforated filter support 134 in the slot 288. Thus, the permeable structure 124 and the perforated filter support 134 are both removable and replaceable. In addition, the permeable structure 124 and the perforated filter support 134 may be swapped out for different structures 124 and supports 134 depending on the type of solid feed, the expected gases, and other factors.

FIG. 12 is a cross-sectional side view of an embodiment of the solid feed guide 156 of FIG. 9 having the vent 258, taken within line 10-10 of FIG. 9. The solid feed guide is as described in FIG. 11 except the solid feed guide includes two vent passages 312 and 314 separated by a divider 316. In certain embodiments, the number of passages may vary. For example, the number of passages may vary from 1 to 8 or any other suitable number. As illustrated, the two passages 312 and 314 may allow simultaneous purging and/or venting operations to occur within the vent 258. Also, in certain embodiments, purging may occur in, for example, passage 312 while venting occurs in passage 314, or vice versa. In other embodiments, the purging and/or venting operations in passages 312 and 314 may be independently operated. The embodiments of vent 258 in FIGS. 10-12 enable venting of high pressure gases that leak past solids in a compacted condition near the outlet 24 of the solid feed pump 12, thereby improving solids filling at the inlet 22 and pump performance.

Technical effects of the disclosed embodiments include providing a system to manage gas in the solid feed pump 12, in particular, to vent high pressure gas that may leak past solid feed in a solids locked condition near the outlet 24 of the pump 12. The system includes providing vents 14 that include filters 30 with removable permeable structures 124 to vent the high pressure gas from the pump 12. The vents 14 also allow a purge gas flow, in the opposite direction of the flow for venting high pressure gas, to clean or purge the filters 30. The system also includes a gas management system 16 to operate the venting and purging operations. The venting of the high pressure gas may improve pump performance by improving solid filling at the inlet 22 and improving stability of the solids discharging at the outlet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a solid feed pump vent configured to couple to a solid feed pump, wherein the solid feed pump vent is configured to be disposed adjacent an outlet of the solid feed pump;
a solid feed pump filter configured to mount to the solid feed pump vent, wherein the solid feed pump filter comprises a permeable structure; and
an annular housing having at least one vent outlet, a perforated filter support extends annularly inside the annular housing, and the permeable structure extends annularly inside the perforated filter support, wherein the annular housing, the perforated filter support, and the permeable structure are configured to be disposed adjacent the outlet circumferentially about an outlet pipe extending from the outlet.

2. A system, comprising:
a solid feed fuel pump, comprising:
a solid feed flow path within the solid feed fuel pump configured to route a solid fuel flow from an inlet to an outlet of the solid feed fuel pump; and
a vent comprising a filter, wherein the vent is configured to discharge a fluid flow that is opposing the solid fuel flow within the solid feed fuel pump, the vent is disposed within the solid feed fuel pump, and the filter comprises a permeable structure; and
a solid feed guide having the permeable structure disposed within the solid feed fuel pump adjacent the outlet, the solid feed guide comprises a guide wall that extends crosswise into the solid feed flow path, a vent passage extending from the guide wall through another portion of the solid feed guide, and the permeable structure is coupled to the guide wall and extends both along the vent passage and crosswise into the solid feed flow path.

3. A system, comprising:
a solid feed pump vent configured to couple to a solid feed pump, wherein the solid feed pump vent is configured to be disposed within the solid feed pump;
a solid feed pump filter configured to mount to the solid feed pump vent, wherein the solid feed pump filter comprises a permeable structure; and
a solid feed guide having the permeable structure configured to be disposed within the solid feed pump adjacent an outlet, the solid feed guide comprises a guide wall that is configured to extend crosswise into a solid feed flow path of the solid feed pump and a vent passage extending from the guide wall through another portion of the solid feed guide, wherein the permeable structure is coupled to the guide wall, extends along the vent passage, and is configured to extend crosswise into the solid feed flow path.

4. The system of claim 3, comprising the solid feed pump having the solid feed pump vent and the solid feed pump filter, wherein the solid feed pump comprises the solid feed flow path configured to route a solid fuel flow from an inlet to the outlet of the solid feed pump, and the solid feed pump vent is configured to discharge a fluid flow that is opposing the solid fuel flow within the solid feed pump, and wherein the permeable structure is configured to filter the fluid flow from the solid feed pump prior to discharging the fluid flow from the solid feed pump through the solid feed pump vent away from the solid feed pump.

5. The system of claim 3, wherein the permeable structure comprises a compacted particulate structure comprising a plurality of metal particles, a plurality of ceramic particles, or a combination thereof, compacted together, wherein the compacted particulate structure comprises an average pore size of less than approximately 100 microns.

6. A system, comprising:
a solid feed fuel pump, comprising:
a solid feed flow path within the solid feed fuel pump configured to route a solid fuel flow from an inlet to an outlet of the solid feed fuel pump; and
a vent comprising a filter, wherein the vent is configured to discharge a fluid flow that is opposing the solid fuel flow within the solid feed fuel pump, the vent is disposed adjacent the outlet, and the filter comprises a permeable structure and a perforated filter support disposed adjacent the permeable structure;

wherein the solid feed fuel pump comprises an outlet pipe that extends from the outlet, the vent is disposed circumferentially about the outlet pipe adjacent the outlet, and the vent comprises an annular housing having at least one vent outlet, the perforated filter support extends annularly inside the annular housing, and the permeable structure extends annularly inside the perforated filter support.

7. The system of claim 6, wherein the permeable structure comprises perforations.

8. The system of claim 1, wherein the permeable structure comprises a compacted particulate structure.

9. The system of claim 8, wherein the compacted particulate structure comprises a plurality of metal particles, a plurality of ceramic particles, or a combination thereof, compacted together.

10. The system of claim 1, wherein the permeable structure comprises an average opening or pore size of less than approximately 100 microns.

11. The system of claim 6, comprising a fuel preparation unit coupled to the inlet of the solid feed fuel pump, wherein the fuel preparation unit is configured to prepare a solid carbonaceous fuel as a solid feed for the solid feed fuel pump.

12. The system of claim 6, comprising a gasifier coupled to the outlet of the solid feed fuel pump.

13. The system of claim 1, comprising a filter purge system coupled to the vent, wherein the vent is configured to vent a gas from the solid feed fuel pump through the filter in a first direction, and the filter purge system is configured to direct a purge gas through the filter in a second direction opposite from the first direction.

* * * * *